United States Patent [19]

Prakash

[11] Patent Number: 5,168,167
[45] Date of Patent: Dec. 1, 1992

[54] OPTICAL SCANNER HAVING CONTROLLABLE LIGHT SOURCES

[75] Inventor: Ravinder Prakash, Concord, N.C.

[73] Assignee: International Business Machines Corporation, Armonk, N.Y.

[21] Appl. No.: 648,694

[22] Filed: Jan. 31, 1991

[51] Int. Cl.⁵ ............................................. G06K 7/10
[52] U.S. Cl. ..................................... 250/566; 250/236
[58] Field of Search ............... 250/235, 236, 563, 572, 250/555, 556, 566, 568; 359/204; 358/474, 475, 480, 481, 482, 483

[56] References Cited

U.S. PATENT DOCUMENTS

| | | | |
|---|---|---|---|
| 4,414,583 | 11/1983 | Hooker, III | 358/300 |
| 4,424,442 | 1/1984 | Kitamura | 250/236 |
| 4,547,038 | 10/1985 | Mori | 359/204 |
| 4,647,145 | 3/1987 | Maeda et al. | 250/236 |
| 4,797,558 | 1/1989 | West | 250/235 |
| 4,924,321 | 5/1990 | Mijagawa et al. | 358/296 |
| 4,933,549 | 6/1990 | Fujioka et al. | 250/235 |
| 4,978,849 | 12/1990 | Goddard et al. | 250/235 |
| 5,006,704 | 4/1991 | Mochizuki et al. | 250/235 |
| 5,053,619 | 10/1991 | Arimoto et al. | 250/235 |

*Primary Examiner*—David C. Nelms
*Assistant Examiner*—John R. Lee
*Attorney, Agent, or Firm*—J. R. Hanway; A. P. Tennent

[57] ABSTRACT

A scanner for reading indicia on a member, surface, sheet, or similar object. Several laser diodes are used to separately generate laser beams which are scanned across the member as separate beams. The light spots produced by the beams on the member are not coincident with each other. Light reflected from the scanned member is imaged onto a linear CCD array which combines or integrates the reflected light produced by each spot to produce the resulting data for the corresponding location. Controlling the output of the laser diodes can customize the overall wavelength of the scanning light and the energy profile of the light across the scan. Some component tolerances of the system are reduced because less than the entire light spot is used to illuminate an area imaged onto the CCD sensors.

18 Claims, 3 Drawing Sheets

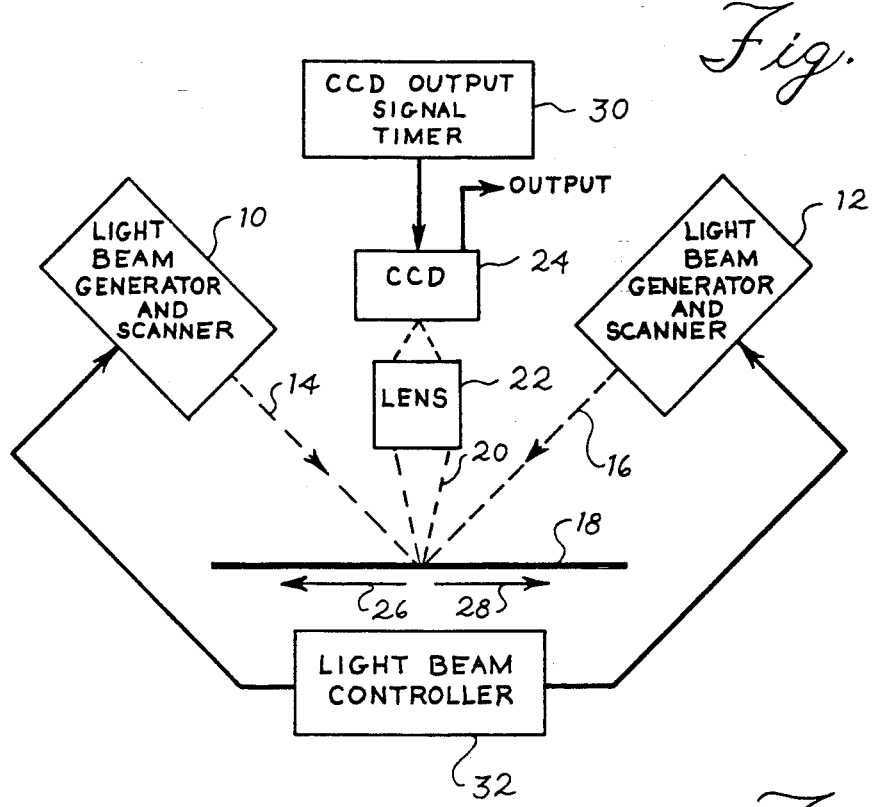
Fig. 1.
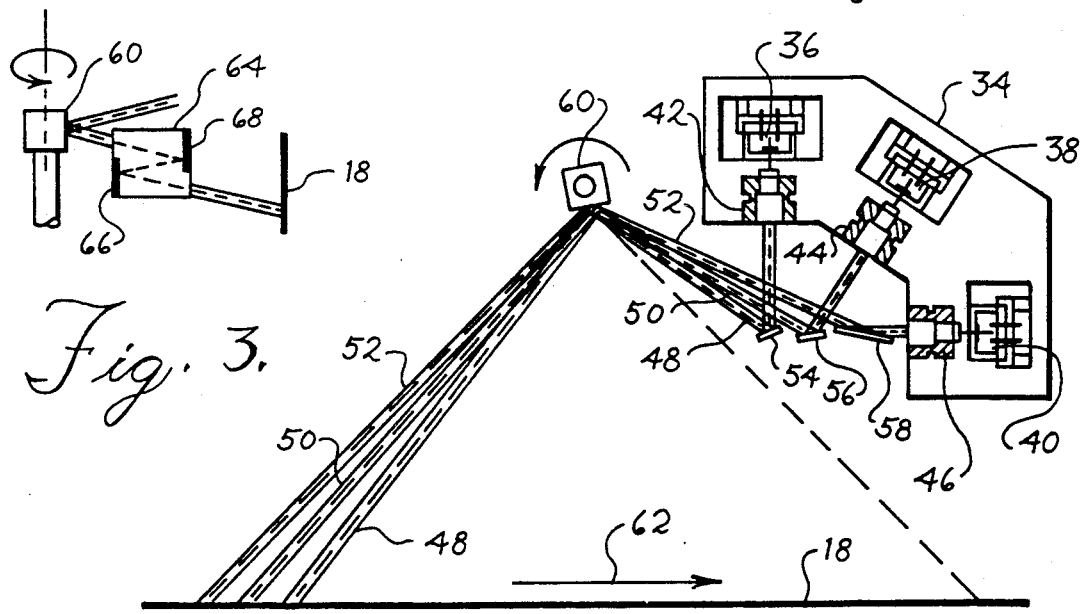
Fig. 2.
Fig. 3.

OPTICAL SCANNER HAVING CONTROLLABLE LIGHT SOURCES

BACKGROUND OF THE INVENTION

1. Field of the Invention

This invention relates, in general, to optical scanners and, more specifically, to illumination devices for producing reflected light from a scanned member.

2. Description of the Prior Art

Optical scanners can be used to convert optical indicia or information existing on a member or surface, such as a sheet of paper, into corresponding electrical signals. Such scanners usually require a means for illuminating the member being scanned. The reflected light from the member is then detected by a photosensitive device or imaged onto a sensor array, such as a charged coupled device (CCD), where the optical energy is converted into electrical signals or data. Laser diodes can be conveniently used for producing the illumination needed during this process. Laser diodes are desirable for this function since they are relatively inexpensive and power efficient. However, in some scanner applications the use of laser diodes is limited due to the limited light produced by a single diode.

In order to make laser diodes attractive alternatives in scanner illuminating applications which require high light intensities, the use of laser diode arrays has been suggested. These arrays use several diodes to increase the overall output power level to a workable value. U.S. Pat. No. 4,924,321, issued on May 8, 1990, discloses an image read-out device which uses a semiconductor laser array to provide the necessary illumination level during a read-out operation. The array uses a beam splitter and prisms to combine the separate laser beams into a single beam which is scanned or deflected across the member being scanned. While this approach may be beneficial in some cases, conventional beam splitters reduce the overall light output by approximately 50% since half of the beam energy passes through the silvered portion of the splitter and the other half is reflected. In the referenced patent, the number of diodes used during read-out and reproduction of an image is changed since the latter function of this device does not require the high illumination levels needed during the read-out mode.

Another important consideration in using the scanner illuminating system of the referenced patent is maintaining exact alignment of the spot of light produced by the laser beams, since reflected light from the entire spot is received by the sensor device. In other words, if the illuminating spot is displaced from the desired position the resulting electrical signal produced by the scanner can be in error. Therefore, it is desirable, and an object of this invention, to provide an illumination system which makes alignment less critical and which gives an efficient method of combining scanning light produced by a laser diode array.

Several characteristics of optical scanners can affect the uniformity and accuracy of scanned data obtained from the scanner. Such items as non-uniformity of an imaging lens or CCD sensor, either inherent in their design or because of manufacturing tolerances, scanned member location relative to the scanning spot, and scanning beam velocity changes across the scanned member can lead to inaccurate electrical signals representing the indicia on the scanned member. For these reasons, it is also desirable, and an object of this invention, to provide an efficient scanner system which can reduce or compensate for non-uniformities experienced by other scanner architectures.

SUMMARY OF THE INVENTION

There is disclosed herein a new and useful optical scanner which is constructed to allow several advantages over prior art scanners. An illumination source using a plurality of separately generated laser beams is used to illuminate a scan line on the member being scanned. These beams form separate light spots on the scanned member at different locations along the scanned line. A linear charged coupled device (CCD) is used to sense the light reflected by the light spots and imaged upon the CCD. By integrating the signals from individual sensors on the CCD over the time necessary for all of the spots to cover the location on the member corresponding to the sensor, a composite signal is produced from the laser generated light spots. By using the scanner apparatus taught by this invention, the light scanning the surface can be modified to compensate for various non-uniformities in the scanning, exposure, and optical systems of the scanner. In addition, wavelength control of the scanning light can be accomplished readily by changing the amount of light emitted by one or more of the laser beam generating devices.

According to a specific embodiment of the invention, the laser beams are generated by separate laser diodes which are supported in a mounting block to produce beams which are not parallel with each other. These beams are reflected by mirrors positioned at different angles to concentrate the beams onto a rotating polygon. The beams are deflected by the rotating polygon across the scanned member to produce light spots which are not coincident with each other. An optical system is used to image the scanned line upon a linear CCD device which has a plurality of individual sensors corresponding to specific locations along the scanned line. Because of the integrating or combining action of the charge at each sensor due to each separate light spot which scans across the scanned member a composite or total charge signal for each location on the scanned member can be produced. Since it is the sum of the individual light spot reflections which produce the overall reading for that location, low power laser diodes may be used for the illumination if enough diodes are used to provide the required total signal. By displacing the light spots along the scanned line instead of superimposing the spots one upon another, the efficiency of the illuminating device is enhanced over prior art devices since beam splitters are not required to be used.

BRIEF DESCRIPTION OF THE DRAWINGS

Further advantages and uses of this become more apparent when considered in view of the following details description and drawings in which:

FIG. 1 is a block schematic diagram of an optical scanner constructed according to this invention;

FIG. 2 is a top view of an illuminating device used in the invention;

FIG. 3 is a side view of a folding lens which may be used with the invention:

DETAILED DESCRIPTION OF THE PREFERRED EMBODIMENTS

Figure 4:
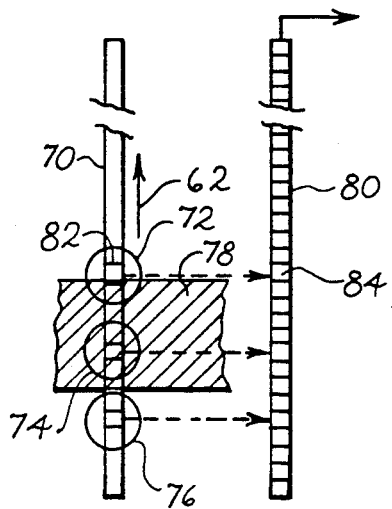
FIG. 4 is a diagram illustrating the relationship between the scanning light spots and the corresponding individual CCD sensors.

Throughout the following description similar reference characters refer to similar elements or members in all of the figures of the drawings.

Referring now to the drawings, and to FIG. 1 in particular, there is shown a schematic block diagram of an optical scanner constructed according to a specific embodiment of this invention. The scanner includes the light beam generators and scanners 10 and 12 which respectively produce light beams 14 and 16 containing a plurality of individual laser beams. These beams are scanned across the member being scanned 18 which may be a sheet of paper containing information or printed indicia thereon. Other types of members may be scanned according to this invention, such as flat and three-dimensional objects and display or read-out devices. In some applications it may be sufficient to use only one light beam generator and scanner to illuminate the surface of the member 18 when some shading of raised surfaces is not objectionable.

The main scanning direction of the light beams 14 and 16 is substantially perpendicular to the plane of FIG. 1. Reflected light 20 from the member 18 is imaged, by means for imaging a limited area of light spots generated by the light beams, such as an imaging lens 22, onto the sensor or charged coupled device (CCD) 24. In this specific embodiment, the CCD 24 is a linear device having a plurality of separate sensors arranged in a line pattern perpendicular to the plane of FIG. 1. Thus, the scanner is effectively a line scanner which scans the member 18 in the main scanning direction perpendicular to FIG. 1. A complete scan of the member 18 is accomplished by moving the scanner apparatus and the scanned member 18 relative to each other so that the scanned illuminated line is passed across the complete surface. This relative movement produces a sub-scanning direction of movement, which is in the direction of either arrows 26 or 28. In normal operation, the scanned line would start at one end of the scanned member 18 and the member 18 would be moved in one direction until the entire member has been scanned.

The individual sensors of the CCD 24 sense or detect the light energy from a particular location on the scanned member 18 as the generated light spots sweep past each location at different instants of time. In order to get a composite or overall output electrical signal corresponding to the optical indicia on the member 18, the light spots produced by each laser beam are allowed to illuminate the same location before the accumulated charge is clocked out of the CCD 24. The timer 30 responds to spot location information and determines when the charges in the CCD 24 will be clocked-out to produce the composite output signal.

The separately generated light beams produced by the generators 10 and 12 are controlled by the light beam controller 32. This controller effectively turns on or off certain of the light beams produced by the generators, or regulates their output by using pulse width modulation, to obtain a desired energy profile across the scanning line. This profile may be for wavelength control intensity control, location control, or other control desired to produce an efficient and customized light scanning pattern across the member 18.

FIG. 2 is a top view of an illuminating device which can be used as one of the light beam generators and scanners shown in FIG. 1. A mounting block 34 contains the semiconductor laser diodes 36 38 and 40. These laser diodes are used to generate separate laser beams which are not parallel to each other and are collimated by the collimating lenses 42, 44, and 46 respectively. Although illustrated in this embodiment with three laser diodes the mounting block 34 may contain more or less than three diodes without departing from the teachings of the invention.

The laser beams 48, 50 and 52 which are generated by the laser diodes are reflected from the mirrors 54, 56 and 58, respectively. The use of these mirrors allows the laser diodes to be physically separated from each other without further extending the length of the beams, thereby enhancing the compactness of the structure. The generated laser beams are deflected by the rotating polygon 60 to scan the beams across the scanned member 18. For clarity reasons. FIG. 2 is oriented 90 degrees with respect to the generator and scanner shown in FIG. 1. Thus, the main scanning direction 62 shown in FIG. 2 is, in FIG. 1, perpendicular to the plane containing FIG. 1.

As can be seen in FIG. 2, the three laser beams arrive at the member 18 at different locations. The beams impinging upon the scanned member 18 produce three spots of light which are simultaneously scanned across the member in the main scanning direction 62. These spots of light illuminate indicia on the scanned member 18 and the reflected light from the indicia is imaged onto the CCD. as shown in FIG. 1. Since each location along the scanned line will be illuminated by each of the spots at different times, the full charge on the corresponding sensor of the CCD is not obtained until all three spots have illuminated the indicia. By appropriately delaying the output signal from the CCD until all of the spots of light illuminate the same imaged location, the signal from the CCD will be a composite signal representing a particular spot or location on the scanned member 18 after illumination by all three spots of light.

It is emphasized that the use of multiple laser diodes allows for wavelength control of the overall illuminating light directed upon the indicia on the member 18. In combination with the imaging of the reflected light upon a CCD array, this arrangement permits the use of other construction features. For example, a galvo mirror may be used in place of the rotating polygon 60 to deflect the laser beams. Galvo mirror deflectors or scanners usually exhibit less preciseness in the placement of the deflected beam than a rotating polygon. However, as will be discussed later herein, the exact placement of the laser beam according to this invention is not critical in developing proper operation of the scanner. In addition, since the scanned member or document is being illuminated with near collimated light the scanner system is substantially insensitive to document location changes which effectively lengthen or shorten the beam length before impinging upon the scanned member.

Another device which may be used because of the relaxed spot location tolerances of the present invention is shown in FIG. 3. FIG. 3 is a side view of a folding mirror which may be used between the rotating polygon 60 and the scanned member 18 to reduce the length of the beam and enhance the compactness of the overall structure. The folding mirror 64 is constructed of an optically transparent material, such as glass or plastic, which has opposite sides covered with a reflective silver coating, such as coatings 66 and 68. Thus, a light beam entering the folding mirror 64 is reflected back and forth through the transparent material before emerging from the material and traveling to the scanned member 18. Here again, such mirrors are subject to vibration and misalignment and are sometimes not useful in apparatus where the spot must be maintained very precisely. However, because of the wide tolerance of the spot location afforded by the present invention, a folding mirror system may be used to reduce the scanner's size without deteriorating the accuracy of the scanner.

FIG. 4 is a diagram illustrating the relationship between the scanning light spots and the individual CCD sensors on which the light spots are imaged. Line 70 shown in FIG. 4 represents the positions where the laser beam spots progress across the scanned member in the main scanning direction 62.

Light spots 72, 74 and 76 are produced on the scanned member by the corresponding laser beams which, in relation to FIG. 2, would be beams 48, 50 and 52, respectively. Although drawn as circular, the spots produced by the light emanating from the laser diodes may have other shapes, such as elliptical. An elliptical spot having axis dimensions of $0.8 \times 2.0$ mm would sufficiently illuminate the member for this scanning system. The solid line 78 illustrated in FIG. 4 is representative of indicia which can be contained on the scanned member 18. In such case, the reflected light from spot 76 has a greater intensity than the light reflected from spot 74, and the intensity of the light reflected from spot 72 is between the other two reflected light intensities.

The CCD array 80 is a linear array with sensors extending in the main scanning direction. This effectively permits a line scan across the scanned member 18, as represented by line 70, since the line 70 is imaged onto the sensor array 80. The spots 72, 74 and 76 are not coincident with each other in that they are not illuminating the same area on the scanned member at the same time. However, each area on the scanned member is illuminated by all of the light spots in the course of a complete line scan. For example, area 82 in the line scan 70 is imaged upon the individual sensor location 84 of the CCD sensor array 80. Area 82 is first illuminated by the spot 72, then by the spots 74 and 76, in succession. By allowing the CCD to receive the reflected light due to each spot before the electrical signal is obtained from the CCD, a composite or overall electrical signal representing the optical indicia scanned by the light spots at area 82 can be produced. Thus, smaller or less intense light levels may be used for each individual spot and integrated or combined in the CCD to adequately represent the scanned area. This provides for an efficiency enhancement over systems which make the scanning spots for multiple laser beams coincident with each other during the scanning operation, since they normally use beam splitters which reduce the amount of light contained in the coinciding beams.

It is also noted that the spots are larger than the area being imaged upon the CCD sensor array. Consequently, the exact placement of the spots around the area being illuminated and sensed is not critical. Small movements in the spots from the ideal location will not materially affect the electrical signal output representing that area. This permits the use of other components in the scanner which reduce the preciseness of the spot locations without degrading the scanned data.

Figure 5:
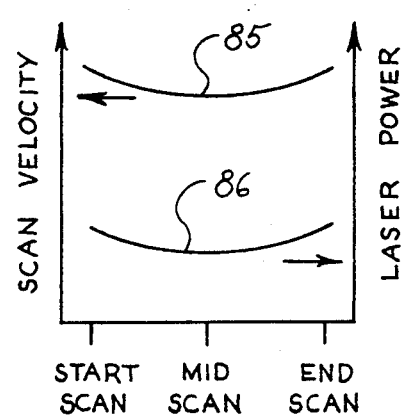
FIG. 5 is a graph illustrating the beam scan velocity and desired laser power as a function of spot location

FIG. 5 is a graph illustrating the relationships between the beam scan velocity, the desired laser power, and the scan position. The scan velocity of the spots across the scanned member is represented by curve 85. As can be seen in FIG. 5, the velocity is lowest when the spot is at the middle of the scan. On the other hand, the scan velocity is highest when the spot is at the extremes of the scanning positions, which are at the start and end of the scan. This is because the angular velocity of the laser beams producing the spots is constant as they are deflected across the flat member being scanned, but the length of the beams is increased. To compensate for the reduced illuminating energy needed at the center of the scan, where the velocity is lower the laser power can be appropriately controlled to reduce the illuminating energy at the power center or mid-scan position, as shown by curve 86. This light profile can be accomplished by the controller 32 shown in FIG. 1 by amplitude modulating or decreasing the number of laser diodes scanning across the scanned member 18 at the mid-scan position. This can be accomplished by turning off one or more diodes. Knowledge of the polygon speed, the geometry of the laser scanning system, and a signal from a conventional start-of-scan sensor all provide information about the location of the spots as they are scanned. Such information can also be used as inputs to the CCD output signal timer 30 shown in FIG. 1.

It is to be appreciated that the light beam controller 32 can also function by pulse-width modulating the laser diodes as they scan across the member, or by activating more or less laser diodes during the scanning sequence. This is accomplished with knowledge of the position of the beam which can be determined by knowing the radial velocity of the deflection and the time instant at which the beam starts to scan across the member 18. The average laser power can be increased by adding more lasers and/or replacing the single cavity lasers with a laser array.

Figure 6:
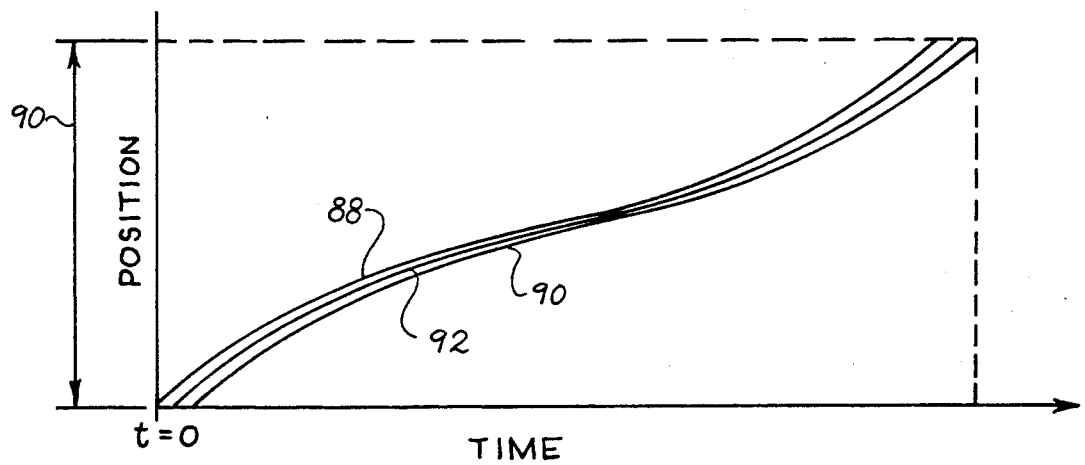
FIG. 6 is a graph of three beam trajectories showing the spot displacement and variable spot velocities.

FIG. 6 is a graph illustrating the relationship between the spot position and the time of the scan. For example curve 88 corresponds to spot 72 shown in FIG. 4. Since spot 72 is the leading spot of the scan, it starts at the beginning ($t=0$) and changes position as it moves across the line scan until it reaches the end of the scan, which is indicated by the distance 90. By a similar analysis, the curve 92 represents the trajectory of the spot 74, and the curve 94 represents the trajectory of the spot 76, shown in FIG. 4. Since these latter two spots are displaced from the first spot, the curves 92 and 94 lag the other curve during the main scan. These curves also show the change in velocity which occurs during the scan. Since the curves are more horizontally shaped at the center or mid-scan position, less position or distance is traveled over a given amount of time than at the ends of the scans. Thus, the velocity of the scanning spots is least at the center of the scan.

Figure 7:
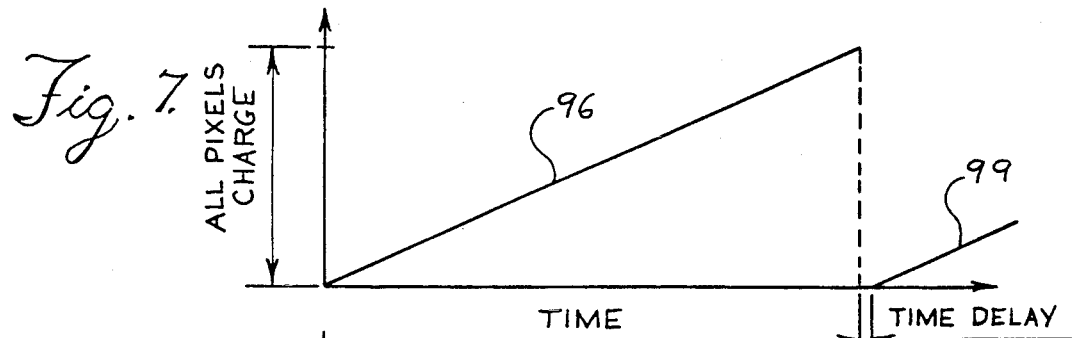
FIGS. 7, 8, 9 and 10 are graphs illustrating overall and individual sensor signal outputs from a CCD. according to an embodiment of the invention.

FIGS. 7, 8, 9 and 10 represent the charge level or output signal from the CCD for a combination of all the pixels or sensor locations in the CCD array and for certain of the individual pixels or sensor locations. In FIG. 7, the curve 96 indicates that the charge on all of the pixels in the linear CCD reaches its upper limit at the end of the scan. In other words, the overall charge level for all the pixels is achieved after a complete line scan. A time delay 98 occurs during which the charges in the CCD are clocked out to provide the data necessary for further electrical processing. The next line scanned is partially represented by the curve 99.

Figure 8:
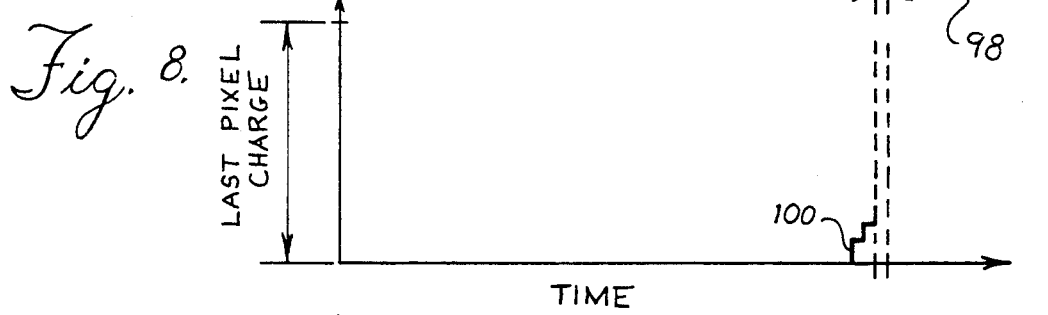
Figure 9:
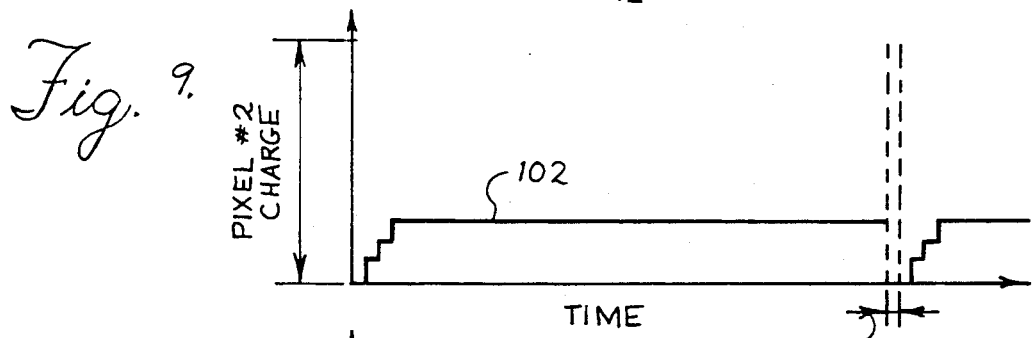
Figure 10:
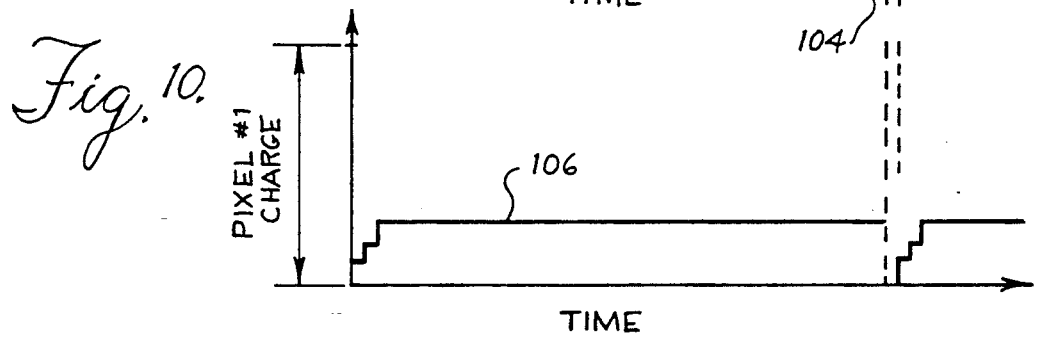

FIGS. 8, 9 and 10 show the charge level on particular individual sensor locations which correspond to particular pixels. These levels assume that the same array level is being sensed or focused upon the sensors. Curve 100 represents the charge for the last pixel in the linear array which is produced when the three spots scan past the last pixel. Curve 102 represents the charge developed at the second pixel from the beginning of the line scan when the three light spots scan past the second pixel. Note that the charge remains the same, after the third light spot passes this pixel, until it is clocked out of the CCD during time period 104. By further example, the first pixel is represented by the curve 106 shown in FIG. 10.

There has been disclosed herein a scanning system which uses a combination of illuminating and sensing subsystems which are arranged to allow the use of tolerance critical components and is readily adaptable to energy and wavelength control without high inefficiencies. It is emphasized that numerous changes may be made in the above-described system without departing from the teachings of the invention. For example, changes which may be made in the system without departing from the teachings of the invention include using two or more diodes along the line scan, using two-dimensional CCD arrays with stacked or ganged laser diode arrays allowing simultaneous scanning of several lines, and using laser diodes which have different predominant wavelengths. By properly modulating laser arrays having diodes of different predominate wavelengths, the wavelength of the overall illuminating light may be customized for special scanning applications. For example, text scanning a document with a blue background may provide better results by using illuminating light which effectively produces an overall wavelength in the shorter, or ultraviolet, range. Selective control of the laser diodes can also be used to mask out certain regions on the scanned member.

As used herein, light refers to visible and invisible forms of radiation, including infrared and ultraviolet. It is intended that all of the matter contained in the foregoing description, or shown in the accompanying drawings, shall be interpreted as illustrative rather than limiting.

I claim as my inventions:

1. An optical scanner for providing electrical information representative of optical indicia existing on a scanned member, said scanner comprising:
    a source of light energy which produces a plurality of separately generated light beams;
    means for scanning each of said beams across the member being scanned, with the beams impinging on the member being scanned to produce separate, non-coincident spots of light, wherein each of the light spots is substantially axially aligned in a main scanning direction;
    an array of light sensors, each of the sensors having means for integrating multiple charges of light energy, positioned to sense light reflected from the light spots, whereby each of the sensors integrates successive signals representative of reflected light energy from the light spots; and
    means for imaging upon the light sensors in said array a limited area of the light spots produced on the member being scanned.

2. The optical scanner of claim 1 wherein the light energy source includes first and second laser diodes respectively producing first and second light beams, and wherein the scanner includes means for selectively controlling the light emanating from said laser diodes.

3. The optical scanner of claim 1 including means for timing the output of the electrical signals from the light sensor array to produce a composite signal representative of a specific area on the scanned member which is scanned at different times by different light beams.

4. The optical scanner of claim 1 wherein the produced separate spots of light are displaced from each other in the main scanning direction.

5. The optical scanner of claim 2 wherein the first and second laser diodes are aligned to emit their respective laser beams non-parallel to each other.

6. The optical scanner of claim 5 wherein the non-parallel light beams are reflected toward the scanning means by first and second mirrors oriented at different angles.

7. The optical scanner of claim 1 wherein the scanning means is a rotating polygon.

8. The optical scanner of claim 1 wherein the scanning means is a galvo mirror.

9. The optical scanner of claim 1 wherein a folding lens is positioned between the scanning means and the member being scanned to reduce the scanned beam length.

10. The optical scanner of claim 1 wherein the produced spots of light are larger than the area on the scanned member sensed by an individual sensor on the light sensor array.

11. The optical scanner of claim 1 wherein the array of light sensors is a linear charge coupled device (CCD).

12. The optical scanner of claim 11 also including means for producing relative motion between the scanning beams and the scanned member, thereby allowing a complete two-dimensional member to be scanned.

13. The optical scanner of claim 1 wherein the light sensor array is a two-dimensional array and the light energy source includes additional laser diodes which simultaneously produce light spots on the scanned member in a direction perpendicular to the main scanning direction.

14. The optical scanner of claim 2 wherein the means for selectively controlling the laser diodes regulates the light from one or more diodes to establish a desired overall wavelength characteristic for all of the scanned light beams.

15. The optical scanner of claim 2 wherein the means for selectively controlling the laser diodes regulates the light from one or more diodes to establish a desired overall light power profile across the scanned member.

16. An optical scanner for providing electrical information representative of optical indicia existing on a scanned member, said scanner comprising:
    a light source containing at least first and second laser diodes respectively producing first and second non-parallel light beams;
    means for scanning said first and second beams across the member being scanned, with the beams impinging on the member being scanned to produce separate, non-coincident spots of light which are displaced from each other in a main scanning direction, wherein each of the light spots is substantially axially aligned in a main scanning direction;

means for selectively controlling the light emanating from said laser diodes;

an linear CCD array of light sensors positioned to sense light reflected from the light spots, whereby each of the sensors integrates successive signals representative of reflected light energy from the light spots;

means for imaging upon the light sensors in said array limited areas of the light spots produced on the member being scanned; and means for timing the output of electrical signals from the light sensor array to produce a composite signal for the scanned indicia on the scanned member.

17. A method of scanning optical indicia on a scanned member to produce electrical information representative of the optical indicia, said method including the steps of:

illuminating the scanned member with first and second non-coincident light spots which are substantially axially aligned in a main scanning direction to scan the same indicia on the scanned member but are displaced from each other in the main scanning direction;

scanning the spots across the scanned member;

imaging less than the complete area of each spot onto at least one sensor of a sensor array;

integrating within each sensor successive signals representative of reflected light energy from the light spots scanned across the scanned member; and outputting an electrical signal from the sensor array which is responsive to the light imaged on each sensor.

18. The scanning method of claim 17 including the steps of selectively controlling the light emanating from said laser diodes to provide a desired overall light profile across the scanned member, and timing the output of electrical signals from the light sensor array to produce a composite signal for the scanned indicia on the scanned member.

* * * * *